(12) United States Patent
Luo et al.

(10) Patent No.: US 10,399,782 B2
(45) Date of Patent: Sep. 3, 2019

(54) BOTTLE CONVEYOR, BOTTLE GRIPPER MECHANISM, BOTTLE GRIPPER ASSEMBLY FOR FILLING MACHINE

(71) Applicant: HANGZHOU YOUNGSUN INTELLIGENT EQUIPMENT CO., LTD., Hangzhou, Zhejiang Province (CN)

(72) Inventors: Bangyi Luo, Hangzhou (CN); Ziquan Zhang, Hangzhou (CN); Leichun Wang, Hangzhou (CN); Xiaohui Zhou, Hangzhou (CN)

(73) Assignee: HANGZHOU YOUNGSUN INTELLIGENT EQUIPMENT CO., LTD., Hangzhou, Zhejiang Province (CN)

( * ) Notice: Subject to any disclaimer, the term of this patent is extended or adjusted under 35 U.S.C. 154(b) by 0 days.

(21) Appl. No.: 15/773,268

(22) PCT Filed: Sep. 14, 2016

(86) PCT No.: PCT/CN2016/098986
§ 371 (c)(1),
(2) Date: May 3, 2018

(87) PCT Pub. No.: WO2017/076130
PCT Pub. Date: May 11, 2017

(65) Prior Publication Data
US 2018/0319598 A1 Nov. 8, 2018

(30) Foreign Application Priority Data

Nov. 4, 2015 (CN) .......................... 2015 1 0738538
Nov. 4, 2015 (CN) ...................... 2015 2 0868786 U
Nov. 4, 2015 (CN) ...................... 2015 2 0874166 U

(51) Int. Cl.
*B65G 17/12* (2006.01)
*B67C 3/24* (2006.01)
*B65G 17/40* (2006.01)

(52) U.S. Cl.
CPC ............. *B65G 17/12* (2013.01); *B65G 17/40* (2013.01); *B67C 3/24* (2013.01); *B67C 3/242* (2013.01)

(58) Field of Classification Search
CPC ................. B65G 17/12; B65G 17/067; B65G 2201/0244; B65G 17/42; B65G 17/40; B67C 3/24
(Continued)

(56) References Cited

U.S. PATENT DOCUMENTS

| 3,981,389 | A | * | 9/1976 | Babunovic | ............. | B65G 17/44 |
| | | | | | | 198/803.15 |
| 5,295,343 | A | | 3/1994 | Ueda et al. | | |
| 6,085,627 | A | * | 7/2000 | Denney | .................. | B26D 3/281 |
| | | | | | | 264/163 |
| 6,227,588 | B1 | * | 5/2001 | Cassoni | .................... | B65H 5/08 |
| | | | | | | 198/803.9 |

(Continued)

FOREIGN PATENT DOCUMENTS

| CN | 103420153 A | 12/2013 |
| CN | 204400589 U | 6/2015 |
| CN | 105293407 A | 2/2016 |
| CN | 205222656 U | 5/2016 |
| CN | 205328585 U | 6/2016 |

(Continued)

*Primary Examiner* — James R Bidwell
(74) *Attorney, Agent, or Firm* — Muncy, Geissler, Olds & Lowe, P.C.

(57) ABSTRACT

The present invention provides a bottle conveyor for a filling machine, comprising multiple pairs of bottle-gripping members and a circulating chain conveyor mechanism, and a pair of bottle-gripping members is mounted, via an open-close modular mechanism, to a convey chain of the circulating chain conveyor mechanism. The open-close modular mechanism is provided with a rotary support capable of being opened as a V-shape, a synchronization mechanism configured to define the opened V-shape, an elastic mechanism configured to provide a bottle-gripping force to the bottle-gripping member and a self-restoring force for the opened V-shape, and an external force import mechanism. A mechanism configured to open the bottle-gripping members is provided respectively at a bottle entrance location and a (Continued)

bottle exit location of the bottle conveyor, and the mechanism configured to open the bottle-gripping members cooperates with the external force import mechanism to provide an external force. The bottle conveyor can rapidly open or close the bottle-gripping members on the circulating chain conveyor mechanism directly, thus improving the conveyance efficiency and speed, alleviating loading of a motor, and simplifying the structure of a robotic arm and the structure for opening or closing the bottle-gripping members in the filling machine.

25 Claims, 3 Drawing Sheets

(58) Field of Classification Search
USPC ....... 198/470.1, 476.1, 803.2, 803.9, 867.14, 198/466.1, 803.1, 803.15, 867.12
See application file for complete search history.

(56) References Cited

U.S. PATENT DOCUMENTS

| | | | |
|---|---|---|---|
| 6,314,876 B1 * | 11/2001 | Ackley | A61J 3/007 |
| | | | 101/44 |
| 6,752,258 B2 * | 6/2004 | Ludwig | B65G 35/06 |
| | | | 198/463.1 |
| 7,195,114 B2 * | 3/2007 | van de Hazel | B65G 11/123 |
| | | | 198/803.14 |
| 8,439,413 B2 * | 5/2013 | Cirio | B67C 3/242 |
| | | | 198/803.7 |
| 8,770,395 B2 * | 7/2014 | Junk | B65B 43/52 |
| | | | 198/803.15 |
| 2005/0109422 A1 | 5/2005 | Duman | |

FOREIGN PATENT DOCUMENTS

| | | | | |
|---|---|---|---|---|
| EP | 286514 | * | 10/1988 | B65G 17/26 |
| WO | WO2011121624 A1 | | 10/2011 | |

* cited by examiner

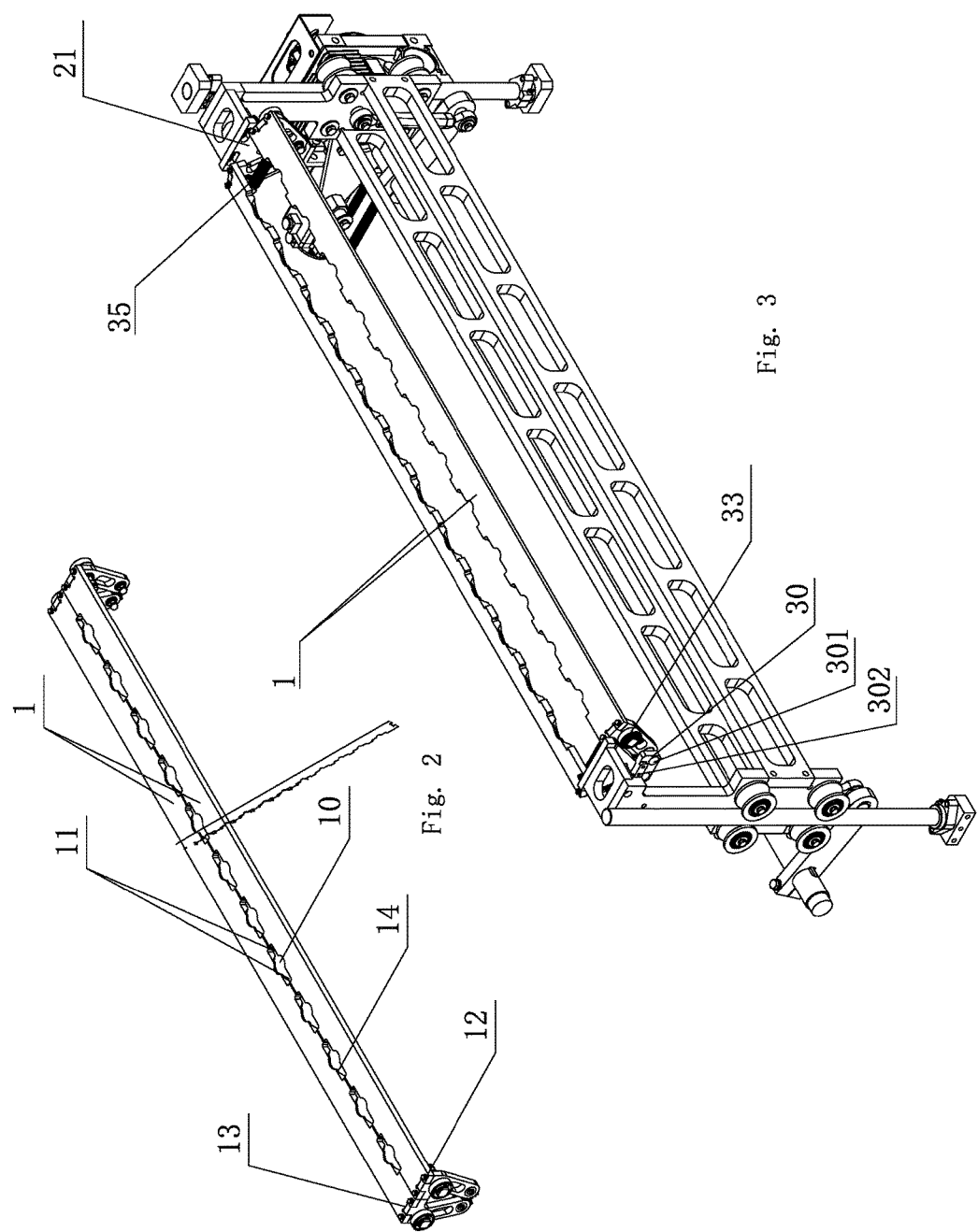

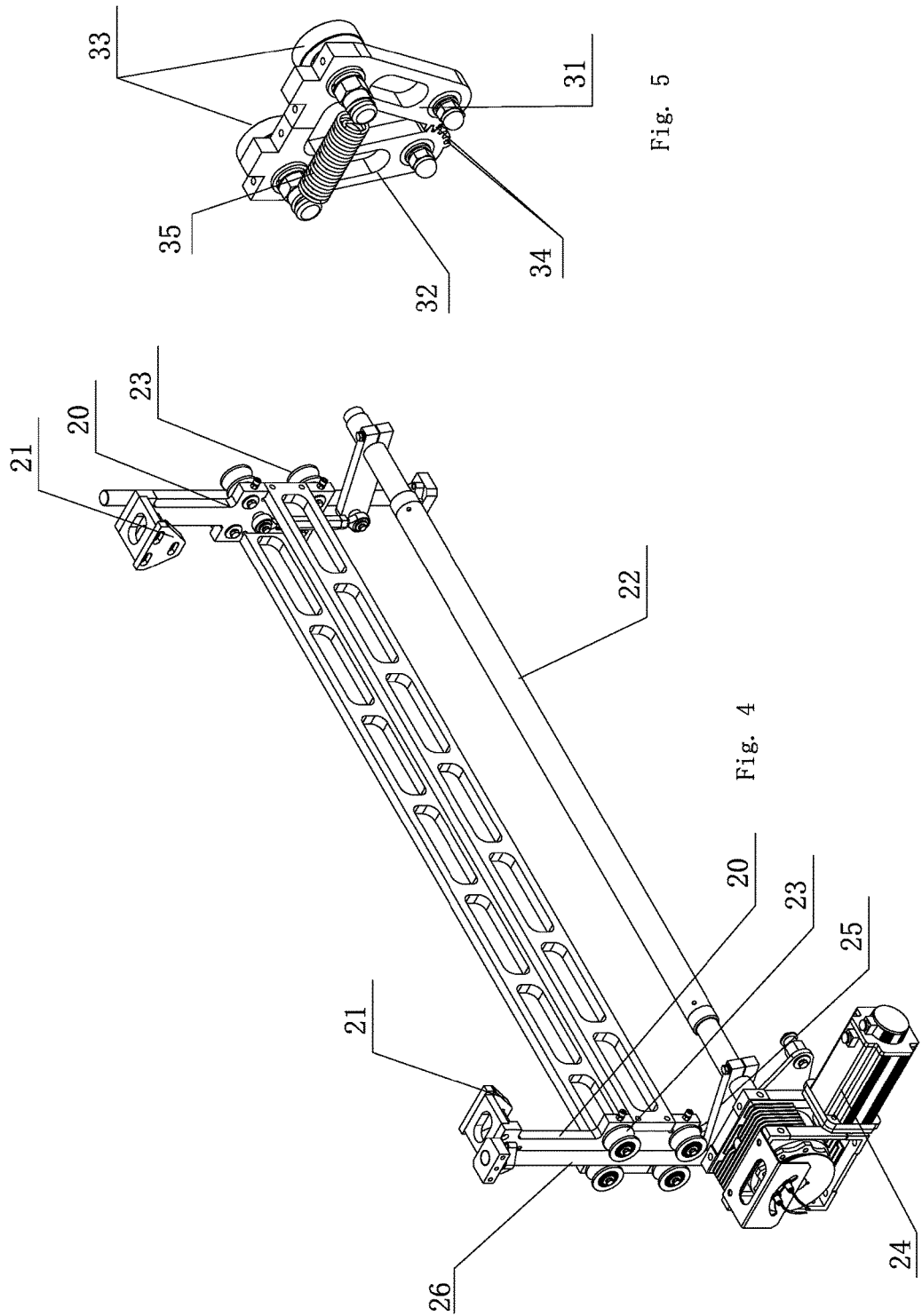

BOTTLE CONVEYOR, BOTTLE GRIPPER MECHANISM, BOTTLE GRIPPER ASSEMBLY FOR FILLING MACHINE

FIELD OF THE INVENTION

The present invention relates to a field of packaging machinery, and in particular to a bottle conveyor, a bottle gripper mechanism, and a bottle gripper assembly for a filling machine.

BACKGROUND

For bottle linear conveyor mechanism for the production process of filling machines such as filling and capping, bottle-gripping plates are placed on circulating chain conveyor mechanism, and bottles are clamped and suspended to move forward by bottle-gripping plates. For this kind of conveyor mechanism, it is difficult to change the direction of bottle-gripping plate on both ends of the conveyor mechanism, moreover, the circulating chain conveyor mechanism is loaded with bottle-gripping plates, with heavy load, which proposes high requirements for the motor power; in addition, complex mechanism needs to be equipped for taking and placing bottles.

SUMMARY

One object of the present invention is to provide a novel bottle conveyor for a filling machine, to improve the conveyance efficiency and speed, alleviate loading of a motor, and simplify the structure of filling machine. To achieve this object, the present invention adopts the following technical solutions:

A novel bottle conveyor for a filling machine, comprising multiple pairs of bottle-gripping members, each pair of bottle-gripping members being capable of opening and closing, with multiple bottle-gripping openings that can be opened or closed, and the bottle conveyor further comprising a circulating chain conveyor mechanism, wherein:

a pair of bottle-gripping members is mounted, via an open-close modular mechanism, to a convey chain of the circulating chain conveyor mechanism, to perform opening and closing actions on the circulating chain conveyor mechanism;

The open-close modular mechanism is provided with a rotary support capable of being opened as a V-shape, a synchronization mechanism configured to define the opened V-shape, an elastic mechanism configured to provide a bottle-gripping force to the bottle-gripping member and a self-restoring force for the opened V-shape and an external force import mechanism, the open-close modular mechanism is provided with a rotary support capable of being opened as a V-shape, a synchronization mechanism configured to define the opened V-shape, an elastic mechanism configured to provide a bottle-gripping force to the bottle-gripping member and a self-restoring force for the opened V-shape, and an external force import mechanism, and the external force being a driving force for the opened V-shape;

A mechanism configured to open the bottle-gripping members is provided respectively at a bottle entrance location and a bottle exit location of the bottle conveyor, the mechanism configured to open the bottle-gripping members cooperates with the external force import mechanism to provide an external force.

On the basis of the foregoing technical solutions, the present invention further adopts the following technical solutions:

A mechanism configured to open the bottle-gripping members comprises an adjustable control member, through cooperating the adjustable control member with a rolling member of the external force import mechanism, the rotary support is opened in V-shape in a cut-in manner.

The rotary support comprises a front swing min and a rear swing arm arranged in a V-shape, lower ends thereof being rotatably connected to a mounting member, and the mounting member being connected to the conveyor chain; the synchronization mechanism comprises a pair of gears engaged each other, the pair of gears being at lower ends of the front swing arm and the rear swing arm respectively, and the elastic mechanism being connected between the front swing arm and the rear swing arm. Further, the external force import mechanism uses a pair of rolling members, the pair of rolling members being respectively mounted on the front swing aim and the rear swing min arranged in V-shape.

The left and right ends of a pair of bottle-gripping members are respectively mounted on a conveyor chain via the open-close modular mechanism to perform opening and closing actions on the circulating chain conveyor mechanism; the mechanisms configured to open the bottle-gripping members on the left and right ends that cooperate with the open-close modular mechanisms on the left and right ends move synchronously driven by a power through coupling of a transmission shaft.

A mechanism configured to open the bottle-gripping members comprises a lifting guide mechanism and a lifting mechanism, the lifting mechanism being lifted by power-driven rotation of a swing bar, the lifting guide mechanism comprises a guide rod and a guide wheel on the lifting mechanism; the control member is mounted on the lifting mechanism.

The rotary support comprises a front swing arm and a rear swing arm arranged in a V-shape, the ends of paired bottle-gripping members being respectively connected to the front swing arm and the rear swing arm, and when the paired bottle-gripping members are closed and collided due to the width of the bottle-gripping member, the front swing arm and the rear swing arm are arranged in V-shape.

The bottle-gripping opening of the bottle-gripping member has an extended bottle-allowing opening on the left and right sides.

Another object of the present invention is to provide a bottle gripper mechanism of a bottle conveyor for a filling machine, to improve the conveyance efficiency of the bottle conveyor for a filling machine and simplify the structure of the filling machine. To achieve this object, the present invention adopts the following technical solutions:

A bottle gripper mechanism of a bottle conveyor for a filling machine, comprises a pair of two bottle-gripping members, the pair of two bottle-gripping members being capable of opening and closing, with a plurality of bottle-gripping opening for opening and closing, wherein:

The pair of two bottle-gripping members are connected to an open-close modular mechanism;

The open-close modular mechanism is provided with a rotary support capable of being opened as a V-shape, an elastic mechanism configured to provide a bottle-gripping force to the bottle-gripping member and a self-restoring force for the opened V-shape and an external force import mechanism, the external force being a driving force for the opened V-shape, the rotary support being connected to the conveying mechanism through a mounting member.

On the basis of the foregoing technical solutions, the present invention further adopts the following technical solutions:

The open-close modular mechanism is provided with a synchronization mechanism configured to define the opened V-shape.

The rotary support comprises a front swing arm and a rear swing arm arranged in a V-shape, lower ends thereof being rotatably connected to the mounting members, and the elastic mechanism being connected between the front swing arm and the rear swing arm.

The rotary support comprises a front swing arm and a rear swing arm arranged in a V-shape, lower ends thereof being rotatably connected to the mounting members, and the elastic mechanism being connected between the front swing arm and the rear swing arm; the synchronization mechanism comprises a pair of gears engaged each other, the pair of gears being at lower ends of the front swing arm and the rear swing arm respectively.

The external force import mechanism uses a pair of rolling members, the pair of rolling members being respectively mounted on the front swing arm and the rear swing arm arranged in V-shape.

The rotary support comprises a front swing arm and a rear swing arm arranged in a V-shape, the ends of paired bottle-gripping members being respectively connected to the front swing arm and the rear swing arm, and when the paired bottle-gripping members are closed and collided due to the width of the bottle-gripping member, the front swing arm and the rear swing arm are arranged in V-shape.

The bottle-gripping opening of the bottle-gripping member has an extended bottle-allowing opening on the left and right sides.

The mounting member is connected with a conveyor chain of the bottle conveyor.

The mounting member has an adapter connection structure, the adapter connection structure having a connecting hole adapted to the rotary support and a connecting hole adapted to the chain.

Another object of the present invention is to provide a bottle gripper assembly of a bottle conveyor for a filling machine, capable of improving the bottle transfer of the bottle-gripping robotic arm and the bottle-gripping member. To achieve this object, the present invention adopts the following technical solutions:

A bottle gripper assembly of a bottle conveyor for a filling machine, comprises a pair of two bottle-gripping members, the pair of two bottle-gripping members have multiple bottle-gripping openings, wherein: the bottle-gripping opening of the bottle-gripping member has an extended bottle-allowing opening on the left and right sides.

On the basis of the foregoing technical solutions, the present invention further adopts the following technical solutions:

The bottle-gripping member is provided with a connecting hole and both ends of the bottle-gripping member are provided with a tenon groove or a tenon.

The bottle-gripping member is a plate-shaped member.

The thickness of the bottle-gripping member is reduced around the bottle-gripping opening, to form a bottle-gripping edge at the bottle-gripping opening.

The thickness of the bottle-gripping member is reduced around the bottle-gripping opening, to form a bottle-gripping edge at the bottle-gripping opening, the length of the bottle-allowing opening exceeds the reduced portion.

The bottle-allowing opening is sufficient to allow a bottle-gripping end of a bottle-gripping robotic arm to enter.

Using the technical solutions in the present invention, the bottle conveyor can rapidly open or close the bottle-gripping members on the circulating chain conveyor mechanism directly, compared with the previous bottle conveyors, the present invention can improve the conveyance efficiency and speed, alleviate loading of a motor, and simplify the structure of a robotic arm and the structure for opening or closing the bottle-gripping members in the filling machine while moderately reducing the arrangement density of the bottle-gripping member.

BRIEF DESCRIPTION OF THE DRAWINGS

FIG. 2 is a combination diagram of paired bottle-gripping members and open-close modular mechanisms, wherein the paired bottle-gripping members are in a closed state.

FIG. 3 is a working schematic diagram of a mechanism configured to open bottle-gripping members, wherein the paired bottle-gripping members are in an opened state.

FIG. 4 is a schematic diagram of a mechanism configured to open bottle-gripping members.

FIG. 5 is a schematic diagram of an open-close modular mechanism.

DETAILED DESCRIPTION OF THE EMBODIMENTS

Figure 1:
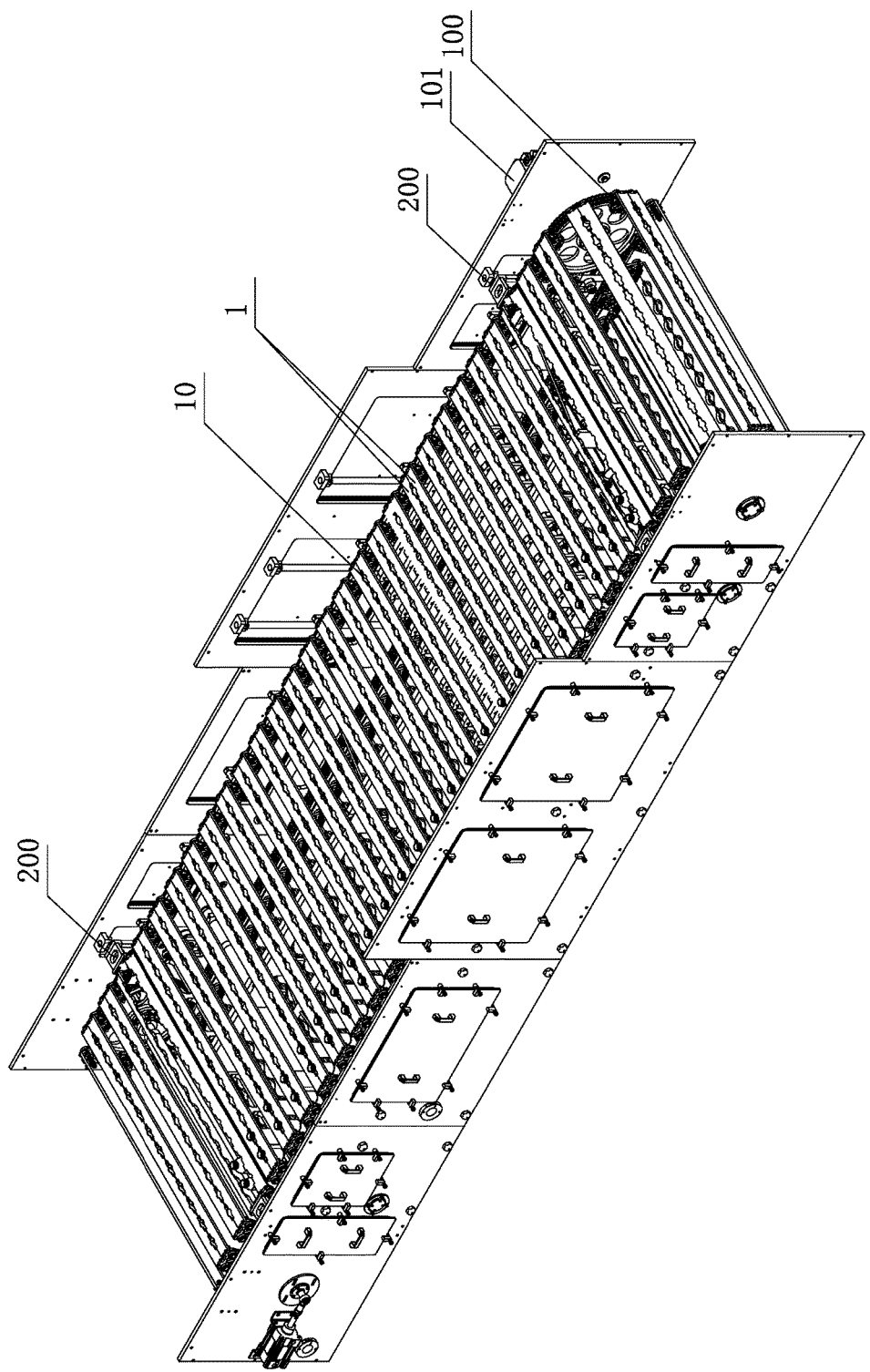
FIG. 1 is a schematic view according to an embodiment of the present invention.

Referring to figures, a bottle conveyor for a filling machine provided in the invention comprises multiple pairs of bottle-gripping members 1, each pair of bottle-gripping members being capable of opening and closing, with multiple bottle-gripping openings 10 that can be opened or closed, the bottle conveyor further comprises a circulating chain conveyor mechanism, and the circulating chain conveyor mechanism is driven by a motor 101.

A pair of bottle-gripping members 1 is mounted, via an open-close modular mechanism, to a convey chain 100 of the circulating chain conveyor mechanism, to perform opening and closing actions on the circulating chain conveyor mechanism. The bottle-gripping member 1 needs not to be taken from the conveyor chain by a robotic arm or a lifting mechanism to open or close, which reduces the operation, simplify the device, improve the speed; moreover, it can achieve the following V-shape opening operation, with more quick speed and simpler structure.

The open-close modular mechanism is provided with a rotary support capable of being opened as a V-shape, a synchronization mechanism configured to define the opened V-shape, an elastic mechanism configured to provide a bottle-gripping force to the bottle-gripping member and a self-restoring force for the opened V-shape and an external force import mechanism. The open-close modular mechanism is provided with a rotary support capable of being opened as a V-shape, a synchronization mechanism configured to define the opened V-shape, the external force being a driving force for the opened V-shape.

A mechanism configured to open the bottle-gripping members is provided respectively at a bottle entrance location and a bottle exit location of the bottle conveyor 200, the mechanism configured to open the bottle-gripping members 1 cooperates with the external force import mechanism, to provide the external force.

A mechanism configured to open the bottle-gripping members comprises an adjustable wedge-shaped control member 21, through the cooperation of the adjustable control member 21 with the rolling member 33 of the external force import mechanism, the rotary support is opened in V-shape in a cut-in manner.

The rotary support comprises a front swing arm 31 and a rear swing arm 32 arranged in a V-shape, lower ends thereof being rotatably connected to a mounting member 30, and the mounting member 30 being connected to the conveyor chain 100. The synchronization mechanism comprises a pair of gears 34 engaged with each other, the pair of gears are disposed on lower ends of the front swing arm 31 and the rear swing arm 32 respectively. The elastic mechanism adopts a spring 35, connected between the front swing arm 31 and the rear swing arm 32. The external force import mechanism uses a pair of rolling members 33, the pair of rolling members 33 are mounted on the front swing arm 31 and the rear swing arm 32 arranged in a V-shape respectively. The wedge-shaped control member 21 is cut in between the pair of rolling members 33 when descending. By coordinating with the elastic mechanism, the control member, after the paired bottle-gripping member is opened, the rolling member 33 forms a mechanism for supporting and stabilizing the bottle-gripping member, making the opening and closing of the bottle-gripping member more sensitive and stable.

The mounting member 30 has an adapter connection structure, the adapter connection structure having a connecting hole 301 adapted to the rotary support and a connecting hole 302 adapted to the chain.

Left and right ends of a pair of bottle-gripping members are mounted, via an open-close modular mechanism, to a convey chain of the circulating chain conveyor mechanism respectively, to perform opening and closing actions on the circulating chain conveyor mechanism; the mechanism configured to open the bottle-gripping members on the left and right ends that cooperate with the open-close modular mechanism on the left and right end move synchronously driven by a power through coupling of a transmission shaft 22.

A mechanism configured to open the bottle-gripping members comprises a lifting guide mechanism and a lifting mechanism 20, the lifting mechanism 20 being lifted by power 24-driven rotation of a swing bar 25. The lifting guide mechanism comprises a guide rod 26 and a guide wheel 23 on the lifting mechanism 20, the wedge-shaped control member is mounted on the lifting mechanism 20.

The ends of paired bottle-gripping members 1 are respectively connected to the front swing arm 31 and the rear swing arm 32, and when the paired bottle-gripping members 1 are closed and collided due to the width of the bottle-gripping member, the front swing arm 31 and the rear swing arm 32 are arranged in V-shape.

The robotic arm grips bottles in an open bottle-gripping opening, and the paired bottle-gripping members are closed, but the gripper of the robotic arm keeps gripping bottlenecks. After the bottles are fixed in the paired bottle-gripping members, the gripper of the robotic arm is moved out of the bottle-allowing opening 11, to start the next cycle. The bottle conveyance is more reliable, and the invention can be applied to the bottles having a bottleneck clamp.

The bottle-gripping member 1 is a plate-shaped member. The bottle-gripping member 1 is provided with a connecting hole 12 and both ends of the bottle-gripping member are provided with a tenon groove 13, and the connecting hole 12 is used to connect with the support, so that the bottle gripper assembly is finally connected to the circulating chain conveyor mechanism. The combination of the tenon groove 13 and the tenon on the support can reinforce the strength of the connection structure of the bottle gripper assembly, prevent deformation gaps, and further improve the stability for conveying bottles.

The thickness of the bottle-gripping member is reduced around the bottle-gripping opening, to form a bottle-gripping edge at the bottle-gripping opening 10, the length of the bottle-allowing opening 11 exceeds the reduced portion 14.

The foregoing descriptions are merely specific embodiments of the present invention, but the structural features of the present invention are not limited thereto. Any changes or modifications made by those skilled in the art within the scope of the present invention will fall within the scope of the protection of the present invention.

What is claimed is:

1. A bottle conveyor for a filling machine, comprising multiple pairs of bottle-gripping members , each pair of the bottle-gripping members being capable of opening and closing, with multiple bottle-gripping openings that can be opened or closed, the bottle conveyor further comprising a circulating chain conveyor mechanism, wherein:
   the pair of bottle-gripping members is mounted, via an open-close modular mechanism, to a convey chain of the circulating chain conveyor mechanism, to perform opening and closing actions on the circulating chain conveyor mechanism;
   the open-close modular mechanism is provided with a rotary support capable of being opened as a V-shape, a synchronization mechanism configured to define the opened V-shape, an elastic mechanism configured to provide a bottle-gripping force to the bottle-gripping member and a self-restoring force for the opened V-shape and an external force import mechanism;
   a mechanism configured to open the bottle-gripping members is provided respectively at a bottle entrance location and a bottle exit location of the bottle conveyor, the mechanism configured to open the bottle-gripping members cooperates with the external force import mechanism to provide an external force as a driving force for the opened V-shape.

2. The bottle conveyor for a filling machine according to claim 1, wherein the mechanism configured to open the bottle-gripping members comprises an adjustable control member, through cooperating the adjustable control member with a rolling member of the external force import mechanism, the rotary support is opened in V-shape.

3. The bottle conveyor for a filling machine according to claim 1, wherein the mechanism configured to open the bottle-gripping members comprises an adjustable wedge-shaped control member, through cooperating the wedge-shaped control member with a rolling member of the external force import mechanism, the rotary support is opened in V-shape.

4. The bottle conveyor for a filling machine according to claim 1, wherein the rotary support comprises a front swing arm and a rear swing arm arranged in a V-shape, lower ends thereof being rotatably connected to a mounting member, and the mounting member being connected to the conveyor chain; the synchronization mechanism comprises a pair of gears engaged with each other , the pair of gears being at lower ends of the front swing arm and the rear swing arm respectively, and the elastic mechanism being connected between the front swing arm and the rear swing arm.

5. The bottle conveyor for a filling machine according to claim 4, wherein the external force import mechanism uses a pair of rolling members, the pair of rolling members being respectively mounted on the front swing arm and the rear swing arm arranged in V-shape.

6. The bottle conveyor for a filling machine according to claim 1, wherein left and right ends of the pair of bottle-gripping members are respectively mounted on a conveyor chain via the open-close modular mechanism, to perform opening and closing actions on the circulating chain conveyor mechanism; the mechanism configured to open the bottle-gripping members on the left and right ends that cooperate with the open-close modular mechanism on the left and right ends move synchronously driven by a power through coupling of a transmission shaft.

7. The bottle conveyor for a filling machine according to claim 1, wherein a mechanism configured to open the bottle-gripping members comprises a lifting guide mechanism and a lifting mechanism, the lifting mechanism being lifted by power-driven rotation of a swing bar, the lifting guide mechanism comprises a guide rod and a guide wheel on the lifting mechanism; a control member is mounted on the lifting mechanism.

8. The bottle conveyor for a filling machine according to claim 1, wherein the rotary support comprises a front swing arm and a rear swing arm arranged in a V-shape, the ends of paired bottle-gripping members being respectively connected to the front swing arm and the rear swing arm, and when the paired bottle-gripping members are closed and collided due to the width of the bottle-gripping member, the front swing arm and the rear swing arm are arranged in V-shape.

9. The bottle conveyor for a filling machine according to claim 1, wherein the bottle-gripping opening of the bottle-gripping member has an extended bottle-allowing opening on the left and right sides.

10. A bottle gripper mechanism of a bottle conveyor for a filling machine, comprising a pair of two bottle-gripping members, the pair of two bottle-gripping members being capable of opening and closing, with a plurality of bottle-gripping openings for opening and closing, wherein:
the pair of two bottle-gripping members is connected to an open-close modular mechanism;
the open-close modular mechanism is provided with a rotary support capable of being opened as a V-shape, an elastic mechanism configured to provide a bottle-gripping force to the bottle-gripping member and a self-restoring force for the opened V-shape and an external force import mechanism providing an external force as a driving force for the opened V-shape, the rotary support being connected to the conveying mechanism through a mounting member.

11. The bottle gripper mechanism of a bottle conveyor for a filling machine according to claim 10, wherein the open-close modular mechanism is provided with a synchronization mechanism configured to define the opened V-shape.

12. The bottle gripper mechanism of a bottle conveyor for a filling machine according to claim 10, wherein the rotary support comprises a front swing arm and a rear swing arm arranged in a V-shape, lower ends thereof being rotatably connected to the mounting members, and the elastic mechanism being connected between the front swing arm and the rear swing arm.

13. The bottle gripper mechanism of a bottle conveyor for a filling machine according to claim 11, wherein the rotary support comprises a front swing arm and a rear swing arm arranged in a V-shape, lower ends thereof being rotatably connected to the mounting members, and the elastic mechanism being connected between the front swing arm and the rear swing arm; the synchronization mechanism comprises a pair of gears engaged with each other, the pair of gears being at lower ends of the front swing arm and the rear swing arm respectively.

14. The bottle gripper mechanism of a bottle conveyor for a filling machine according to claim 12, wherein the external force import mechanism uses a pair of rolling members, the pair of rolling members being respectively mounted on the front swing arm and the rear swing arm arranged in V-shape.

15. The bottle gripper mechanism of a bottle conveyor for a filling machine according to claim 10, wherein the rotary support comprises a front swing arm and a rear swing arm arranged in a V-shape, the ends of paired bottle-gripping members being respectively connected to the front swing arm and the rear swing arm, and when the paired bottle-gripping members are closed and collided due to the width of the bottle-gripping member, the front swing arm and the rear swing arm are arranged in V-shape.

16. The bottle gripper mechanism of a bottle conveyor for a filling machine according to claim 10, wherein each of the bottle-gripping openings of the bottle-gripping members has an extended bottle-allowing opening on the left and right sides.

17. The bottle gripper mechanism of a bottle conveyor for a filling machine according to claim 10, wherein each of the bottle-gripping members is provided with a connecting hole and both ends of the bottle-gripping member are provided with a tenon groove or a tenon.

18. The bottle gripper mechanism of a bottle conveyor for a filling machine according to claim 10, wherein the mounting member is connected with a conveyor chain of the bottle conveyor.

19. The bottle gripper mechanism of a bottle conveyor for a filling machine according to claim 18, wherein the mounting member has an adapter connection structure, the adapter connection structure having a connecting hole adapted to the rotary support and a connecting hole adapted to the chain.

20. A bottle gripper assembly of a bottle conveyor for a filling machine, comprising a pair of two bottle-gripping members, the pair of two bottle-gripping members have multiple bottle-gripping openings, wherein: each of the bottle-gripping openings of the bottle-gripping members has an extended bottle-allowing opening on left and right sides,
the pair of two bottle-gripping members is connected to an open-close modular mechanism;
the open-close modular mechanism is provided with a rotary support capable of being opened as a V-shape, an elastic mechanism configured to provide a bottle-gripping force to the bottle-gripping member and a self-restoring force for the opened V-shape and an external force import mechanism providing an external force as a driving force for the opened V-shape, the rotary support being connected to the conveying mechanism through a mounting member.

21. The bottle gripper assembly of a bottle conveyor for a filling machine according to claim 20, wherein each of the bottle-gripping members is provided with a connecting hole and both ends of the bottle-gripping member are provided with a tenon groove or a tenon.

22. The bottle gripper assembly of a bottle conveyor for a filling machine according to claim 20, wherein each of the bottle-gripping members is a plate-shaped member.

23. The bottle gripper assembly of a bottle conveyor for a filling machine according to claim 20, wherein the thickness of the bottle-gripping members is reduced around the bottle-gripping opening, to form a bottle-gripping edge at the bottle-gripping opening.

24. The bottle gripper assembly of a bottle conveyor for a filling machine according to claim 21, wherein the thickness of the bottle-gripping members is reduced around the bottle-gripping opening, to form a bottle-gripping edge at the bottle-gripping opening, the length of the bottle-allowing opening exceeds the reduced portion.

25. The bottle gripper assembly of a bottle conveyor for a filling machine according to claim 20, wherein each of the bottle-allowing openings is sufficient to allow a bottle-gripping end of a bottle-gripping robotic arm to enter.

* * * * *